(12) United States Patent
Xiao et al.

(10) Patent No.: US 10,642,584 B2
(45) Date of Patent: May 5, 2020

(54) DEFECT DETECTION METHOD, DEVICE, SYSTEM AND COMPUTER READABLE MEDIUM

(71) Applicant: Shenzhen Qianhai Sourcebrella Inc. Ltd., Shenzhen (CN)

(72) Inventors: Xiao Xiao, Shenzhen (CN); Qingkai Shi, Shenzhen (CN); Jinguo Zhou, Shenzhen (CN); Gang Fan, Shenzhen (CN)

(73) Assignee: SHENZHEN QIANHAI SOURCEBRELLA INC. LTD., Shenzhen (CN)

( * ) Notice: Subject to any disclaimer, the term of this patent is extended or adjusted under 35 U.S.C. 154(b) by 62 days.

(21) Appl. No.: 16/119,309

(22) Filed: Aug. 31, 2018

(65) Prior Publication Data

US 2019/0108003 A1   Apr. 11, 2019

(30) Foreign Application Priority Data

Sep. 1, 2017  (CN) .......................... 2017 1 0781158

(51) Int. Cl.
| | |
|---|---|
| *G06F 9/44* | (2018.01) |
| *G06F 8/41* | (2018.01) |
| *G06F 11/36* | (2006.01) |
| *G06F 16/901* | (2019.01) |

(52) U.S. Cl.
CPC .......... *G06F 8/434* (2013.01); *G06F 11/3604* (2013.01); *G06F 16/9024* (2019.01); *G06F 8/433* (2013.01)

(58) Field of Classification Search
CPC .. G06F 8/434; G06F 16/9024; G06F 11/3604; G06F 8/433; G06F 11/3624; G06F 11/3688; G06F 11/3692; G06F 11/3608; G06F 11/366; G06F 21/577; G06F 2221/033; G06F 21/562
See application file for complete search history.

(56) References Cited

U.S. PATENT DOCUMENTS

| | | | | |
|---|---|---|---|---|
| 5,075,883 | A  * | 12/1991 | Friedman | ........... G01M 11/0292 356/124.5 |
| 6,470,293 | B1 * | 10/2002 | Sudoh | .................... G01B 11/00 356/627 |
| 9,251,491 | B2 * | 2/2016 | Chao | ..................... G06Q 10/06 |

(Continued)

*Primary Examiner* — Anna C Deng
(74) *Attorney, Agent, or Firm* — Dorsey & Whitney LLP

(57) ABSTRACT

A method for detecting defects in computer software code comprises: preprocessing a code to check; generating an SEG for the code to check, wherein the SEG includes nodes, data dependency edges and control dependency edges that connect the nodes, wherein, the nodes include value nodes and operator nodes, the value nodes including terminal value nodes representing unknown values or constants generated outside a function, and non-terminal value node representing values generated within the function, wherein each non-terminal value node is associated with a unique memory location, and wherein the data dependency edge is a directed edge connecting a value node to another value node that has a direct data dependency relationship with the value node, and traversing the SEG in a depth-first way backward from a null pointer node in a lowest level of the SEG and generating a bug report when a defect is found.

12 Claims, 12 Drawing Sheets

(56) References Cited

U.S. PATENT DOCUMENTS

| | | | |
|---|---|---|---|
| 10,303,808 B2* | 5/2019 | Subbarayan | G06F 17/5009 |
| 2006/0286539 A1* | 12/2006 | Tidwell-Scheuring | G09B 5/00 434/353 |
| 2011/0085259 A1* | 4/2011 | Maeda | G11B 20/1258 360/40 |
| 2011/0238379 A1* | 9/2011 | Misra | G06F 19/3418 702/187 |

* cited by examiner

US 10,642,584 B2

DEFECT DETECTION METHOD, DEVICE, SYSTEM AND COMPUTER READABLE MEDIUM

CROSS REFERENCE

This application is based upon and claims priority to Chinese Patent Application No. 201710781158.0, filed on Sep. 1, 2017, the entire contents thereof are incorporated herein by reference.

TECHNICAL FIELD

The present disclosure relates to the field of information technology, and particularly to a defect detection method, device, system and computer readable medium.

BACKGROUND

Null pointer dereference (NPD) is a common defect that causes software failures and is not easy to be detected. Statically detecting NPD errors requires very precise data flow analysis to track the information flow, especially that flows into and out from heap.

Program analysis is a prerequisite for program transformations performed by compilers. In short, a compiler is a program dial translates one language (usually a higher level language) into another language (usually a lower level language). A high level language may be easy for people to use in programming, reading, communicating and maintaining. A low level language may be directly interpreted and run by computers. A classical program representation for program analysis is called control flow graph (CFG). CFG based analysis and transformation suffers from two disadvantages. One is that CFG lacks of value information, and the other is that CFG is not a sparse type, and thus it may be slower to detect defects using CFG due to its sense structure.

To solve the above problems, a data structure called value dependence graph (VDG) was proposed. The VDG is a sparse dataflow-like representation and it is a functional representation that represents control flow as data flow and makes explicit all machine quantities, such as stores and I/O channels. Daniel Weise et al. proposed a compiler in 1994, which builds a VDG representing a program, analyzes and transforms the VDG and then produces a control flow graph (CFG) from the optimized VDG. This frame work simplifies transformations when compared with the prior art.

SUMMARY

To solve the problems in the prior art, the present disclosure provides a novel symbolic expression graph (SEG), in which nodes represent program variables and edges represent data dependencies and control dependencies. The present disclosure provides a method of efficiently analyzing programs for defect detection based on the SEG.

According to a first aspect of the present disclosure, a defect detection method is provided. The method comprises: preprocessing a code to check; generating a symbol expression graph (SEG) for the code to check, wherein the SEG includes value nodes, operator nodes, as well as data dependency edges and control dependency edges that connect the nodes, wherein, the value nodes includes terminal value nodes and non-terminal value nodes, the terminal value nodes representing unknown values or constants generated outside a function, the non-terminal value node representing values generated within the function, and each non-terminal value node being associated with a unique memory location, and wherein the data dependency edge is a directed edge connecting a node to another value node that has a direct data dependency relationship with the node, and depth-first traversing the SEG backward from a null pointer node, and generating a bug report when a defect is found.

The method further comprises: when a null pointer is detected, generating a constraint for the null pointer node corresponding to the null pointer; and arriving at a null pointer dereference (NPD) address of the null pointer node, adding the constraint, and determining whether the constraint is satisfied, and if satisfied, generating a bug report.

In the method, the control dependency edge points to an operator node or a Boolean type of value node of a logical operation.

In the method, the control dependency edge is marked with true or false, to indicate the desired result of the logical operation.

In the method, the code to check is a program fragment, and the SEG is constructed bottom-up. In the method, the code to check may include a code snippet.

In the method, the preprocessing includes unrolling loops in the code.

According to a second aspect of the present disclosure, a method for constructing SEG is provided. The method comprises: constructing a node according to an input code statement, the node representing a variable or a constant or an operator; connecting nodes with directed edges to generate data dependency edges; when there are conditions defining the variable, connecting the variables to the conditions with directed edges to generate control dependency edges; and repeating the above steps according to the next input code statement, until the end of the code.

In the method, the control dependency edge points to an operator node or a Boolean type of value node of a logical operation.

In the method, the control dependency edge is marked with true or false, to indicate the desired result of the logical operation.

According to a third aspect of the present disclosure, a defect detection device is provided. The device comprises a memory and a processor, wherein the processor is configured to execute the method of constructing a SEG and the method of defect detection.

According to a fourth aspect of the present disclosure, a non-transitory computer-readable medium with a computer program stored thereon is provided, wherein when the computer program is executed, the method for constructing an SEG and the method for defection detection are performed.

According to a fifth aspect of the present disclosure, a defect detection system is provided. The system comprises a preprocessing module, an SEG generation module and a detection module. In some examples, the system includes a processor and a memory containing programming instructions that, when executed, will cause the processor to cause each of the preprocessing module, the SEG generation module and the detection module to perform certain functions. For example, the preprocessing module may be configured to preprocess a code to check. The code may be programming, instructions in various forms, such as the source code, the object code, or the executable code. In preprocessing the code, the preprocessing module may receive the code in various ways. For example, the preprocessing module may be configured to read program source code from a source code file. In another example, the preprocessing module may read the compiled object code from a portion of the memory of the system. In another example, the preprocessing module may read an executable file from a computer medium, such as a hard drive. In another example, the preprocessing module may receive the code from a communication network, such as a cloud or the Internet. The SEG generation module is configured to generate a symbol expression graph (SEG) for the code to check. The SEG generated by the SEG generation module includes value nodes, operator nodes, as well as data dependency edges and control dependency edges that connect the nodes. The value nodes include terminal value nodes and non-terminal value nodes. The terminal value nodes represent constants or unknown values generated outside a function, the non-terminal value node represents values generated within the function, and each non-terminal value node is associated with a unique memory location. The data dependency edge is a directed edge connecting a node to another value node that has a direct data dependency relationship with the node. The detection module is configured to traverse the SEG in a depth-first way backward from a null pointer node, and generate a bug report when a defect is found. In some, examples, the bug report may be a computer readable file, where the system stores the bug report on the hard drive of the system. In other examples, the bug report may be stored in a memory location and the system may retrieve the bug report and display the content of the bug report on a display of the system.

In the system, the detection module is further configured to, when a null pointer is detected, generate a constraint for the null pointer node corresponding to the null pointer; and arrive at a null pointer dereference (NPD) address of the null pointer node, add the constraint, and determine whether the constraint is satisfied, and if satisfied, generate a bug report. Then, the traversal process returns to a previous node from the NPD address, and the constraint of the NPD address is popped, and the process continues with searching for a next NPD address, if any, until the SEG traversing is completed.

In an example, the control dependency edge points to an operator node or a Boolean type of value node of a logical operation.

In an example, the control dependency edge is marked with true or false, to indicate the desired result of the logical operation.

In an example, the code to check is a program fragment, and the SEG is constructed bottom-up. In an example, the code to check may include a code snippet.

In an example, the preprocessing module is further configured to unroll loops in the code.

It should be understood that the above general description and the following detailed description are merely exemplary, and should not limit the present disclosure in any way.

BRIEF DESCRIPTION OF THE DRAWINGS

Detailed descriptions of exemplary embodiments of the present disclosure will be provided with reference to the accompanying drawings. The above and other objects, features and advantageous will be apparent from the descriptions.

DETAILED DESCRIPTION

Figure 1:
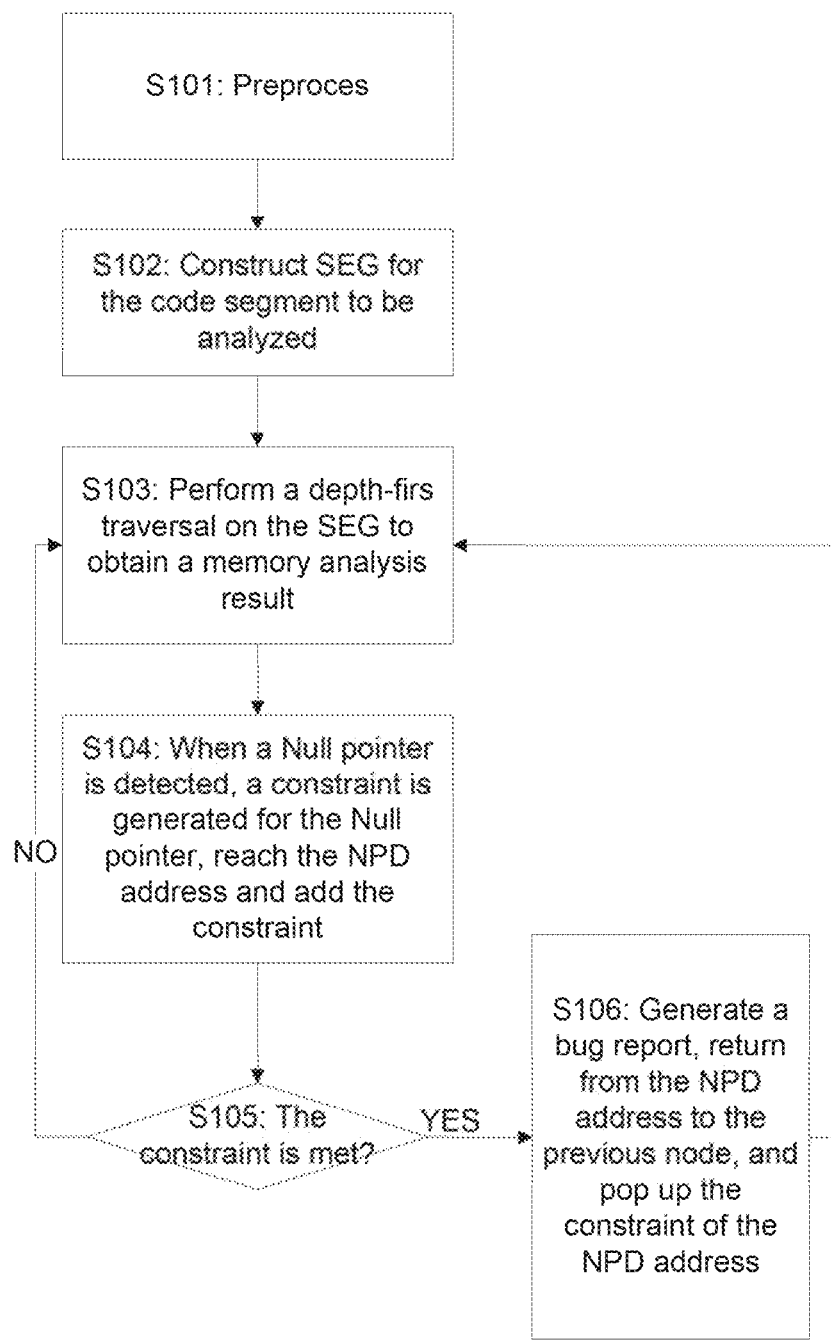
FIG. 1 is a flow chart of a sparse program analyzing process according to an embodiment of the present disclosure.

Exemplary embodiments of the present disclosure will now be described with reference to the accompanying drawings. It should be understood that the exemplary embodiments herein are provided merely to facilitate understanding of the present disclosure and is not intended to limit the present disclosure in any way. These embodiments are provided to make the description of the present disclosure more comprehensive and complete, and to convey the concept of exemplary embodiment to those skilled in the art. The drawings are only schematic representations of the present disclosure and are not necessarily to be drawn in scale. The same reference numerals in the drawings denote the same of similar parts, and the repeated description thereof will be omitted.

Furthermore, the described features, structures, or advantages may be combined in one or more embodiments in any suitable manner. In the following description, numerous specific details are set forth to provide a full understanding of the present disclosure. However, one skilled in the art will appreciate that one or more of the specific details may be omitted, or other equivalent methods, means, steps, etc., may be substituted. For the sake of simplicity, structures, methods, devices, implementations, or operations that are well known in the art will not be described herein.

FIG. 1 shows a flow chart of the defect detection method according to an embodiment of the present disclosure. The method includes the following steps. In step S101, the program to be detected is preprocessed. In step S102, an SEG is constructed for the program to be detected. The SEG includes value nodes, operator nodes, data dependency edges and control dependency edges that connect the nodes. In the SEG, value nodes may be classified into terminal value nodes which represent unknown values generated outside the function and non-terminal value nodes which represent values generated within the function. Each non-terminal value node is associated with a unique memory location. The data dependency edge is a directed edge that connects a node to another value node with which the node has a direct data dependency relationship. The control dependency edge is a directed edge that connects variables to condition when there are conditions that qualify the variables. In step S103, a depth-firs traversal is performed on the SEG by starting from a null pointer of a leaf node in the lowest level of the SEG and traversing the SEG backwards, to obtain a memory analysis result. When a null pointer dereference (NPD) is found, a bug report is generated.

In step S104, when a null pointer is detected, a constraint is generated for the null pointer node corresponding to that null pointer, and the process reaches the NPD address and adds the constraint. In step S105, it is determined whether the constraint is met; if it is satisfied, then the process forwards to step S106. In S106, a bug report is generated, and then the process returns to the previous node, and pops the constraint of the NPD address. Next, the process returns to S103, and continue to search for NPD addresses, if any, until the traversal of the SEG is completed.

In the method, the control dependency edge points to an operator node or a Boolean type of value node of a logical operation.

In the method, the control dependency edge is marked with true or false, to indicate the desired result of the logical operation.

In the method, the code to check is a program fragment, and the SEG is constructed bottom-up.

In the method, the preprocessing includes unrolling loops in the code.

Next, null pointer dereference (NPD) detection algorithm according to the present disclosure will be briefly introduced as follows. The algorithm includes four phases: Pre-model phase, Prerequisite Analysis phase, Post-model phase and Defect analysis phase.

In the pre-model phase, uninteresting constructs are eliminated from input program to simplify subsequent analysis. Switch lowering, loop unrolling and breaking, and etc., are all performed in this phase.

Subsequently, in the prerequisite analysis phase, fundamental information is computed, especially the whole program information that is required by subsequent analysis in this phase. Call graph is constructed based on the result of the prerequisite analysis phase. The call graph is well known in the art for describing structures of programs, and thus the details thereof will be omitted here.

Next, in the post-model phase, the call graph constructed in the prerequisite analysis phase is used to further simplify the code, and the program information is updated. For example, the call edges that form SCCs may be marked to facilitate future analysis iterating the call graph without going in the cycles.

Finally, in the defect analysis phase, the main algorithm is symbolic value flow analysis (SVFA) that produces function summaries to complete inter-procedural analysis. The values of the pointers are still unknown at the moment. SVFA is performed on intermediate representation (IR) that models points-to-relations (left-value dependence) and symbolic values of variables (right-value dependence) together, and then the symbolic expression graph (SEG) can be constructed. The SEG is a novel data structure proposed in the present disclosure. Hereinafter, more details will be provided to explain the construction process of the SEG and the method for detecting defects by using the SEG.

The SEG provided in the present disclosure can compactly represents the value of each variable as a logical and arithmetic expression of variables for external memory locations, such as parameters, global variables, and the reachable heap locations through the parameters and global variables. SEG is a directed acyclic graph (DAG) that is conceptually a fully SSA representation for all variables. By it forward path-sensitive analysis, SEG is constructed bottom-up, that is, starting from the bottom of the SEG, and incrementally works upwards, and hence SAT queries can be evaluated incrementally, SAT means satisfiability problem. If SAT (constrains) is true, means the constraint is satisfied. Also because its DAG nature, certain sub-graphs of SEG can be replaced as constant expressions to speedup constraints solving.

The workflow is very flexible that additional stages can be easily added into the chain to achieve specific goal. For example, in future, in the analysis stage, more precise analyses may be gradually used to refine the bug reports. Each analysis slate only verifies the bug candidates from last stage. This can be done by adding a set of phases between the post-model phase and the defect analysis phase.

Hereinafter, the key algorithms implemented in each phase will be introduced, with the emphasis to the symbolic value flow analysis (SVFA). It should be understood that the details are only provided herein to facilitate understanding and the present disclosure is not limited thereto in any way.

Pre-Model Phase

In the pre-model phase, the code may be modeled by using open source code, for example, LLVM transformation. Table 1 shows the LLVM transformation passes used by pre-model phase.

TABLE 1

| Pass Name | Description |
| --- | --- |
| Lowerswitch | Transforming the switch statements into if statements |
| Lowerinvoke | Transforming the call site that can throw exceptions as a normal call site |
| Loop-simplify | Canonicalizing natural loops by adding pre-header nodes and latch nodes |
| Lessa | Adding $\varphi$ functions to all the loop exit nodes to guard the variables from the loop (loop SSA form) |

Figure 2A:
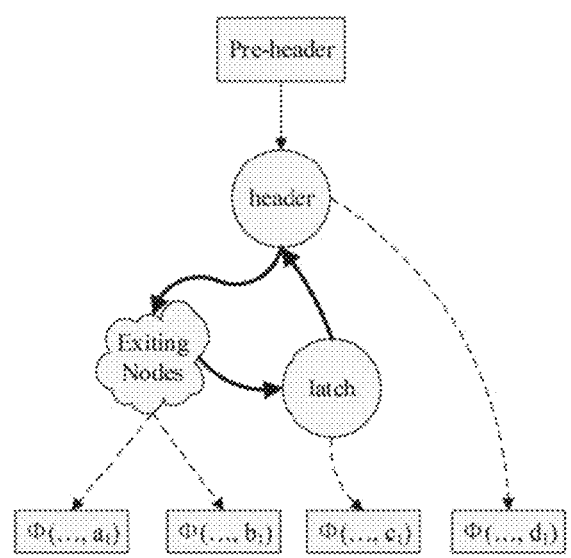
FIG. 2A-2B illustrates an example of loop unrolling process in a pre-model phase according to art embodiment of the present disclosure.
Figure 2B:
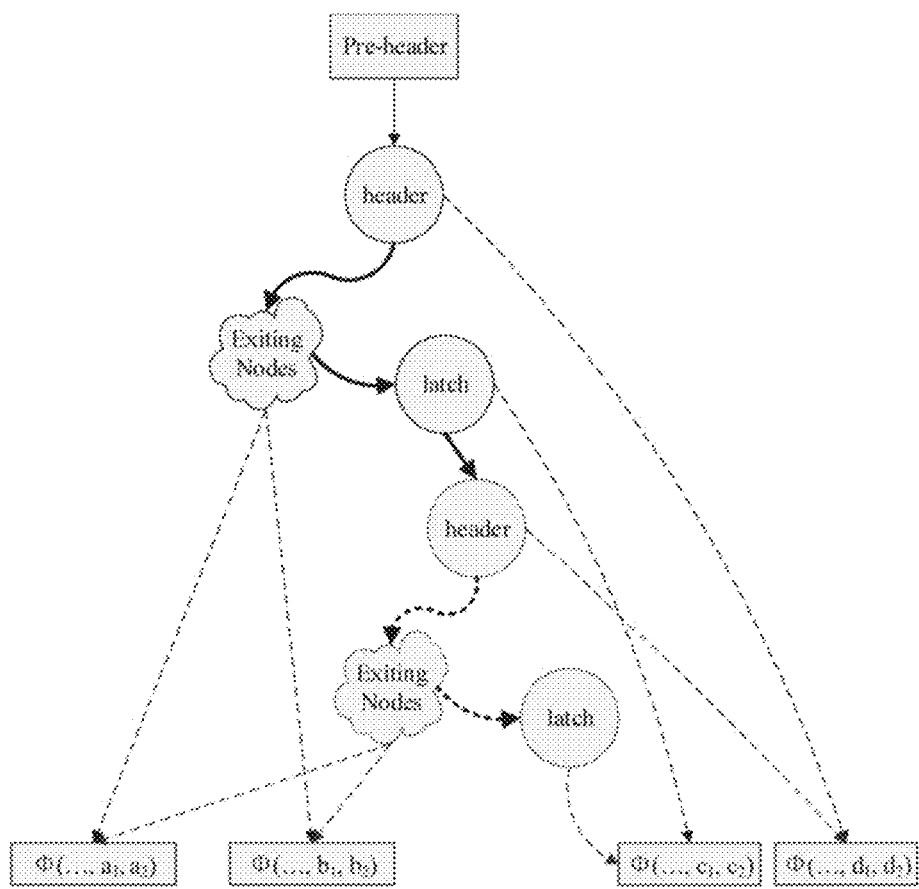

The major work in this step is unrolling all the loops, from inner loop to outer loop, according to the loop nesting structure. Approximating loops are essential for bounded model checking and unrolling is the simplest and also the rudest way. FIGS. 2A and 2B illustrate an example of loop unrolling and breaking.

FIG. 2A shows a loop before unrolling and the loop is in canonical form, that is, the loop has a pre-header and only a single node called latch can go back to the header. The dashed arrows connect the exit nodes inside the loop to the exit nodes outside the loop and all the exit nodes are placed enough $\varphi$ functions to guard the definitions coming from the loop. Certainly, the dash arrow means that the edge may not exist. Unrolling the loop K times is performed by first copying the loop body K times and then updating the defuse relations for the cloned variables.

FIG. 2B shows the result of unrolling the loop in FIG. 2A twice (two copies). Three kinds of updates are performed to the code. First, the latch is connected from the ith loop copy to the header of the (i+1)th loop copy and update the $\varphi$ functions for all the headers. Second, new values are inserted to the $\varphi$ functions for the exit nodes for the cloned variables. Third, the back edge is removed from latch to header in the last loop copy. Currently, if the latch cannot exit the loop, it becomes a hanging node, and an unreachable instruction is appended to latch and rely on the dead code elimination to clean the useless variables. To facilitate understanding of the above process, we briefly explain the terms "latch" and "exit, node" here. Natural loop is a maximal (in inclusion) set of basic blocks such that it contains a special one (header) that dominates all of them and is backreachable from them. Predecessors of header inside loop are called latches. As to exit nodes, for example, on a directed path, a→b→c, a is an entry node of b, b is the entry node of c, c is the exit node of b, and b is the exit node of a. For the entire path, a is the entry node, and c is the exit node.

Prerequisite Analysis Phase

This phase is arranged majorly for gathering global program information. The very fundamental information is call graph. Traditional pointer analysis methods (e.g., DSA) may be used here to compute the call graph, and the details thereof will be omitted. However, only the bottom-up phase of DSA may be used since that is essential for generating call graph and the top-down phase of DSA may be too slow.

Post-Model Phase

A post-model phase is inserted after the prerequisite analysts phase to prepare simplified code for defect analysis. All algorithms performed in this phase are responsible for updating the global program information if it is changed. In the post-model phase, the call graph SCC marking analysis can mark the back edges that from cycles in the call graph. Furthermore, this information can be leveraged by the defect analysis engine to compute bounded analysis results for functions in the cycles. Other important transformations such as constant propagation may be added in this phase.

Defect Analysis Phase

In the present embodiment, the defect analysis algorithm is designed as follows.

⟨ Type($\tau$)⟩ ::=bool|int| {($f_1$, $\tau_1$), . . . , ($f_n$, $\tau_n$)}|$\tau$[ ]|$\tau$*
⟨ Obj(o)⟩ ::=v | {($f_1$, $o_1$), . . . , ($f_n$, $o_n$)}
⟨ Deref(m)⟩ ::=*v|v→$f_1$, $f_2$, . . . $f_n$
⟨ (Expr(e)⟩ ::=null|const(n, $\tau$)|unknown($\tau$)|parm($\tau$)|global ($\tau$)
|&o|&m|new . . .
|o|m|$\epsilon_1$ binop $\epsilon_2$|–$\epsilon$|($\tau$)c.
⟨ Cond(c)⟩ ::=false|true|c|c$_1$ and c$_2$|c$_1$ or c$_2$|v$_1$ comp v$_2$
⟨ Stmt(s)⟩ ::=o←e|m←o|ite(c, Label-T, Label-F)|assert(c) |assume(c)
⟨ binop⟩ ::={+, –, ×, /, mod, band, bor, bxor}
⟨ comp⟩ ::={=, <, ≥, >, ≤, ≠}

The syntax definition of the code for this example algorithm is shown above, where 'ite' stands for if-then-else. The first rule of the algorithm defines the types modeled by the algorithm. The algorithm can support two elementary types, Boolean und integer. The composite type such as C struct, array, and pointer are defined on the elementary types. It should be noted that it is not necessary to model floating point arithmetic in the current algorithm, although the constraint solver Z3 already added support for floating numbers. All floating variables are transformed to integer variables and their values are modeled as unknown.

Rest of the rules defines the variables and the expressions made up by the variables. Particularly, the algorithm supports multi-step pointer expression v→f1.f2 . . . fn, the unknown value that models the values for uninitialized variables and floating variables, the parm value for the function parameters, and the global value for global variables. Since LLVM has transformed long expressions into short expressions by inserting temporary variables, the store and load statements may also be written as* (p+f)=v and v=*(p+f), where f is the offset to the base pointer p.

Next, a may-aliasing analysis based NPD detection algorithm will be described with reference to an example according to the present disclosure.

In the intra-procedure analysis process, it is performed a value flow analysis that find the null pointers and the conditions of those pointers being null.

Value Flow Analysis (VFA)

An exemplary abstract domain of VFA is as below.
$\mathcal{L}$: Local+parameter variables
$\mathcal{G}$: Global variables
O: Abstract objects (new'ed memory)
C: Path conditions
$\mathbb{V}$: Abstract values
$\mathbb{L}$: $\mathcal{L} \cup \mathcal{G} \cup \{O, f\}$
$\delta$: $\mathbb{L} \to \mathbb{V}^n$
$\psi$: $\mathbb{L} \to \mathbb{V}) \to C$ The mission of value flow analysis (VFA) is to compute the set of abstract values an abstract memory location could have, which is the $\delta$ function as shown above. The abstract values are the abstract representations of the concrete values that are concerned by the analysis. The VFA also computes the condition when an abstract location has a given abstract value. The compute result is expressed as a function. For simplicity, the conditional location-value pair is written as $$l \xrightarrow{\psi} v.$$

where l∈$\mathbb{L}$ and v∈$\mathbb{V}$

SSA may be chosen as the start to formulate the VFA, because SSA enables sparse analysis, which can significantly improve the analysis performance. However, the SSA built by LLVM only transformed the top-level variables, i.e. those variables that are not pointed to by pointers. The heap memory locations are also ignored by LLVM, hence the value flow among the heap memory locations are unclear. Therefore, there is a need to resolve the pointer expressions to construct an SSA form that fully encodes the def-use relations for all memory locations.

The central problem here is factoring out the load and store statements. Suppose a pointer p points to the objects $o_1$, $o_2$, . . . , $o_k$, which is obtained by our may-aliasing analysis in Phase 2, a straightforward factoring approach is:

1. For* (p+f)=v, the process replace it with a set of direct assignments to object fields: o1.f=v, o2.f=v, . . . , ok.f=v.

2. For v=*(p+f), the process replace it with an assignment v=χ($o_1$.f, $o_2$.f, . . . , $o_k$.f). The function χ means that one of its parameters can be assigned to v at this place.

The factored assignments to object fields are annotated by their original pointer expressions and these expressions will be visited for bull pointer dereference checking. The array is modeled as a single cell and hence, every load and store to the array will be redirected to the single cell. After the translation of the store and load, all possible assignments to a variable are recovered. Then, a standard SSA construction algorithm may be run to insert the Φ-functions for object fields. The resultant IR is called fully heap-based SSA (HSSA). An example of HSSA is shown in FIG. 3, which is served as the running example of the present disclosure hereinafter.

Figure 3:
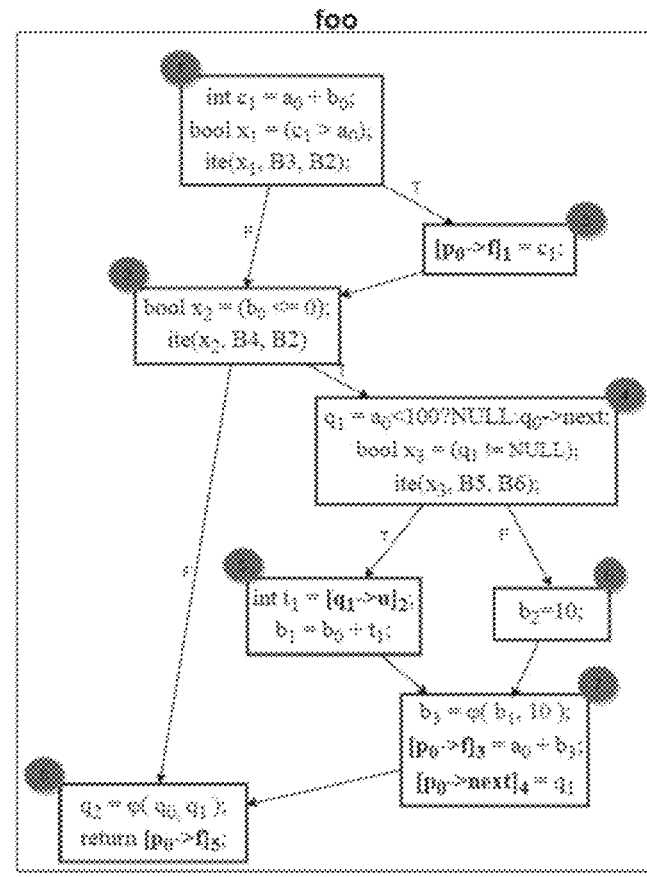
FIG. 3 illustrates a sample code and its un-pruned HSSA form.

FIG. 3 shows a sample code and its un-pruned HSSA form.

Next, the HSSA IR is transformed into a graphical form that uncovers the value computation structure such as in the abstract syntax tree. This graphical form is referred to as symbolic expression graph (SEG) herein, which is a novel data structure proposed by the inventors of the present disclosure.

Figure 4:
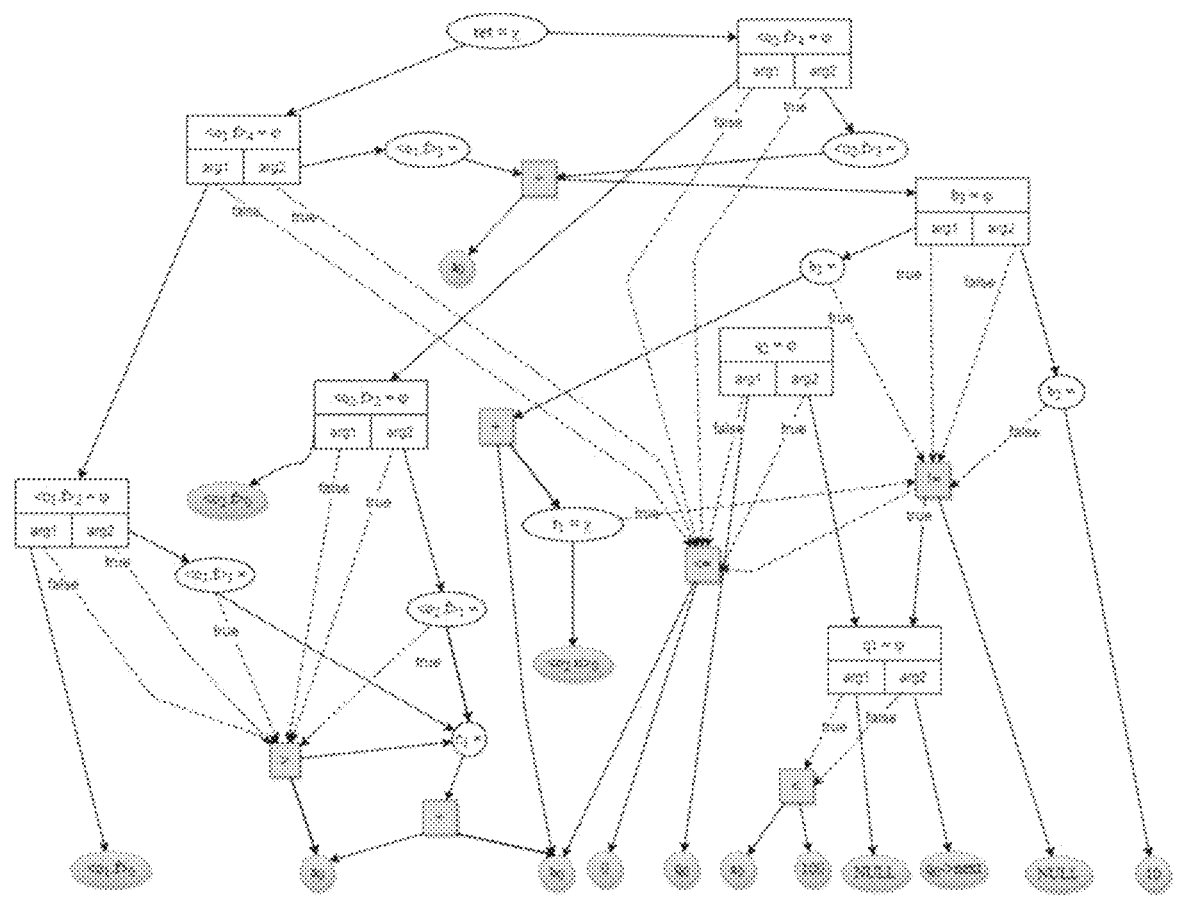
FIG. 4 illustrates an exemplary SEG built according to an embodiments of the present disclosure.

FIG. 4 shows an exemplary SEG constructed according to an embodiment of the present disclosure. The gray ellipse nodes represent terminal value nodes. The uncolored ellipse nodes are non-terminal value nodes. The solid and dashed lines are data and control dependency edges. Every non-terminal value node is attached to a control dependency edge to represent the condition of the value being valid. The label on the control dependency edge is the user's expectation of the condition. For the sake of simplicity, the control dependency edges that are labeled true may be ignored. In FIG. 4, operator nodes are illustrated as gray rectangle nodes.

Formally, an SEG is a 4-tuple (V, O, D, C).

Wherein, V is the set of value nodes. Values are classified into terminal values and non-terminal values. The terminal values represent the unknown values generated outside this function. In the present design, the values for parameters, global variables, and the heap locations accessible to this function are terminal values, which are represented as the gray nodes at the bottom of FIG. 6. The ellipse nodes in FIG. 6 are non-terminal values, which represent the values that are generated within this procedure. A unique memory location may be associated to every non-terminal value node to name that value, due to the SSA nature of SEG.

O is the set of operator nodes that represent all the operators defined in the algorithm.

D is the set of data dependency edges, which are the solid directed lines in FIG. 4.

le;2qC is the set of control dependency edges, which are the dashed directed lines in FIG. 4. The node at the arrow side must be an operator node for a logical operation. The edge may also be annotated with true or false to signify the desired result of the logical operation.

A set of terminal values are also called interface objects (IO), which are formally defined as below:

⟨PIO⟩ ::=param$_1$|global
⟨IO⟩ ::=PIO|*IO|IO→f|IO.f

Wherein, the term PIO stands for primary interface objects. In the grammar for PIO, param$_1$ is the ith parameter of a function and global is the global variable. The recursive part of IO is the memory location that is reachable via pointer dereferences with the PIO as the root, such as <o1.f>0 and <o2.f>0. In current NPD algorithm, the values for IO may be deemed as symbolic values and global information flow will not be tracked.

The pseudo-code for constructing SEG is given below.

The algorithm iterates over the basic blocks of a function in a reverse post order (RPO). For every basic block B, the process first constructs its path condition $pc(B) = \bigvee_{p \in entry \rightsquigarrow B} C(p)$, which is the disjunction of the path constraint $C(p)$ for all the paths p from entry $\rightsquigarrow$ B. However, such path condition can be very verbose. The idea for compacting a path condition is rewriting its definition in a recursive form: $pc(B) = pc(B_{if}) \wedge C(B_{if} \rightarrow B)$, where $B_{if}$ is the control dependent basic block of B and $C(B_{if} \rightarrow B)$ is the condition for routing the program execution front $B_{if}$ to B. In the algorithm 1, the function GetBBCond(b) returns a pair (l, cin), where l is the true or false label and cin is the if condition that B depends on. The GetBBCond function can easily be implemented with the control dependence graph.

Next, the process symbolically evaluates the statements in each basic block sequentially and calls the function Find-CreateExpr to incrementally build SEG FindCreateExpr accepts three parameters, which are the operator, the list of operands, and the path condition. The most involved construct is the Φ function. A gated function γ have to be calculated where $\gamma_i$ is the condition to select the ith element of the Φ function. The gated function may be easily derived with the following Theorem:

Given $\chi_n = \Phi(\chi_1, \chi_2, \ldots, \chi_k)$,
then $\gamma_i(B) = pc(Pred_i(B)) \wedge C(Pred_i(B) \rightarrow B)$,
where $Pred_i(B)$ is the ith predecessor basic block of B.

As described above, the exemplary Algorithm 1 may be used to construct SEG according to the present disclosure.

The SEG constructed by Algorithm 1 has three features:

1. The factored assignments to object fields are interpreted as strong updates. For example, <o1.f>1 does not preserves the value <o1.f>0. The goal is trading soundness for precision.

2. SEG is a maximally shared graph that every sub-graph of SEG is unique, i.e. SEG does not have isomorphic sub-graphs. The identical sub-graphs are avoided by the

---

Algorithm 1: ConstructSEG

```
Input: B: Time set of basic blocks.
1  forall the B ∈ B in resource port-order on CFG do
2  |   (l, C_in) =GetBBCond (B);
3  |   forall the statements S to sequential order in B do
4  |   |   If S: υ = x bop y then
   |   |   |   // bop in a arithmetic operator, such as + or logical operator such as <
5  |   |   |   n_1 = FindOrCreateNode (x);
6  |   |   |   n_2 = FindOrCreateNode (y);
7  |   |   |   n_3 = FindOrCreateExpr (bop, (n_1, n_2), (l, c_in));
8  |   |   |   AssignedData (v, n_3)
9  |   |   end
10 |   |   else if S: v_n = φ(v_1, v_2, ... , v_k) then
11 |   |   |   foreach v_i ∈ (v_1, v_2 ... v_k) do
12 |   |   |   |   n_1 = FindOrCreateNode (v_i);
13 |   |   |   |   P_2 = GetPredBB (y);
14 |   |   |   |   γ_i = CalcGatedCond (P_i, B);
15 |   |   |   end
16 |   |   |   n_r = FindOrCreateExpr (φ, (n_1, n_3 ... n_k), (γ_1, γ2 ... γ_k));
17 |   |   |   AssignNode (v_n, n_r)
18 |   |   else if S: itc(c, Label -T, Label F) then
   |   |   |   // c is a bolean variable that is the result of the boolean expression
19 |   |   |   n_c = FindOrCreateNode (c);
20 |   |   |   SaveITECond (B, n_c);
21 |   |   else if S: v = uop or v = x then
   |   |   |   // Similar to processing v = x bop y
22 |   |   else of S: v_n = x(v_1, v_2, ... , v_k) then,
   |   |   |   // Similar to processing the φ-function. It is path-sensitive points-to analysis is used,
   |   |   |   the gated function γ is the points-to guards. Otherwise, use true as the guards.
23 |   |   end
24 |   end
25 end
```

FindAndCreateExpr function. Examples may be the nodes <o1.f>3 and <o2.f>3, which share the same sub-graph.

3. The path condition that consists of two or more logical operations in different if statements is compactly represented as a logical operation control dependence on another logical operation. For example, the l=operator control depends on the <= operator, which encodes the conditions in the statements if (b<=0) and if (q!=NULL).

The reason for reconstructing the computation process for every variable is that the process can easily discover the infeasible paths and preclude erroneous information flow by solving constraints. In the example, the branches if (c>a) and if (b≤0) cannot be taken simultaneously. This is because the query $SAT((c_1=a_o+b_o)\wedge(c_1>a_o)\wedge(b_o\le0))$ is false. Here, SAT (constrains) is false means the constraints are not satisfied.

An efficient way for determining the set of NULL value memory locations with SEG is described in Algorithm 2.

| Algorithm 2 FindNullPointers |
|---|
| 1    forall the n in SEG do |
| 2      | NullCond[n] = false; |
| 3    end |
| 4    n = the NULL node in SEG; |
| 5    dfsVisit (n, true); |
| 6    forall the n in SEG do |
| 7      | if NullCond[n] ≠ false then |
| 8      |   | NullCond[n] = NullCond[n] $\wedge$ GetControlDep(n); |
| 9      | end |
| 10    end |
| 11    myprocProcedureend dfsVisit(n, $c_t$) // GetControlDep(n) gets the control dependence for node n on SEG |
| 12    $c_n = c_t \wedge$ GetControlDep (n); |
| 13    if SAT($c_n$) = true then |
| 14      | forall the $n_p$ data depends on n do |
| 15      |   | if $n_p$ is not operator node then |
| 16      |   |   | dfsVisit ($n_p$, $c_n$); |
| 17      |   | end |
| 18      | end |
| 19      | NullCond[n] = NullCond[n] $\vee c_t$; |
| 20    end |

The algorithm recursively, visits the nodes from NULL to compute the Null value condition (NullCond(n)) for every memory location n. The advances of this approach are twofold. First, the incremental solving capability of Z3 can be leveraged, to incrementally add the control dependence of a node to the constraint ascending front its child in Line 12. Therefore, the evaluation of the constraint in Line 13 can borrow the intermediate result cached in Z3 for evaluating, its child. Second, the SAT query in Line 13 guarantees that the sub-constraints added to NullCond[n] in Line 18 can really lead to Null value.

Intra-procedural NPD bugs may be reported with NullCond(n)). For every pointer p that could be NULL, all the statements that contain the dereferences *(p+f) under the path condition $\psi$ are visited. The algorithm reports a bug if $SAT(NullCond(p)\wedge p=NULL\wedge\psi)$. constraint p=NULL was added to avoid the false alarms when the null-pointer check p≠NULL is part of $\psi$.

Hereinafter, the defect detection method according to the present disclosure will be described with reference to an example.

Here is an example, in which the code snippet contains three statements:
Z=ϕ(Z1, B1; null, B2);
if(Z) X=Y+3;
if (X>3)*Z;
The first statement Z=ϕ(Z1, B1; null, B2) means that Z=Z1 if the incoming basic block is B1 and Z=null if the incoming basic block is B2. The second statement if (Z) X=Y+3 means to calculate the value of X in the condition that Z is not null, that is, if the incoming basic block is B1. If Z is not null, then X=Y+3. If Z is null, then X is not assigned value. The third statement if (X>3) *Z means that Z may be dereferenced when X>3.

The process of generating the SEG for the above code snippet will be described below. As aforesaid, the SEG includes value nodes, operator nodes, as well as data dependency edges and control dependency edges that connect the nodes, wherein, the value nodes includes terminal value nodes and non-terminal value nodes, the terminal value nodes representing unknown values or constants generated outside a function, the non-terminal value node representing values generated within the function, and each non-terminal value node being associated with a unique memory location, and wherein the data dependency edge is a directed edge connecting a node to another value node that has a direct data dependency relationship with the node.

Figure 5A:
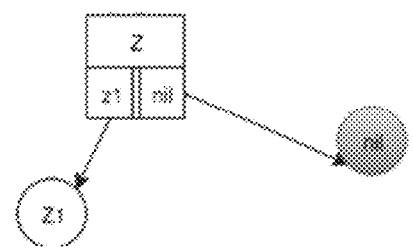
FIGS. 5A-5B illustrate diagrams of constructing the SEG.
Figure 5B:
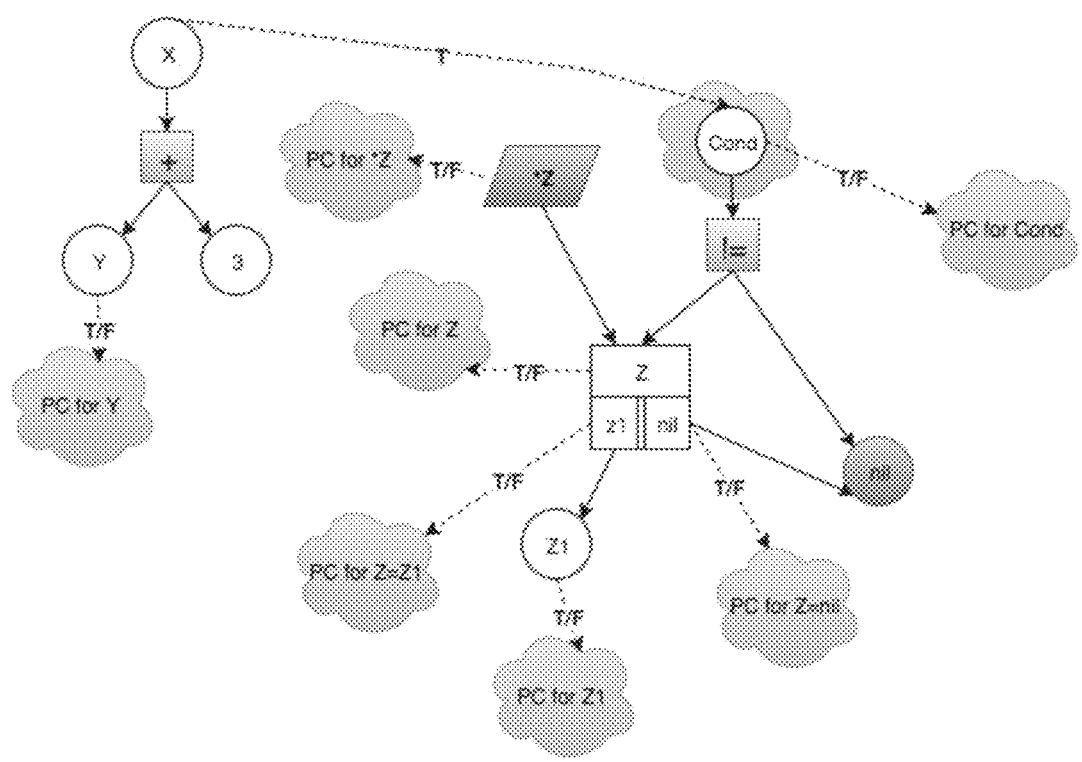

FIGS. 5A and 5B show diagrams for generating SEG for tire above code snippet. As shown in FIG. 5A, for the first statement Z=ϕ(Z1, B1; null, B2), construct a node for the variable Z, Z1 and null, and connect node Z to node Z1 and null with arrows 61 and 62, respectively. The arrows 61 and 62 represent the data-dependences, and thus they are referred to as data dependency edges.

For the second statement if (Z) X=Y+3, similarly, nodes for X, Y, the constant 3 and the operator+are created, respectively. Those nodes are connected by edges that represent the data dependences. Because there is a condition for defining X, the variable X is connected to the condition by a control dependency edge, as shown by the dash line in FIG. 6B. Actually, every node has its control dependence edges to represent in which condition they can be defined The third statement if (X>3) *Z, connects *Z (dereference Z) to Z with certain conditions, that is, X>3. The constructed SEG is as shown in FIG. 5B.

Figure 6A:
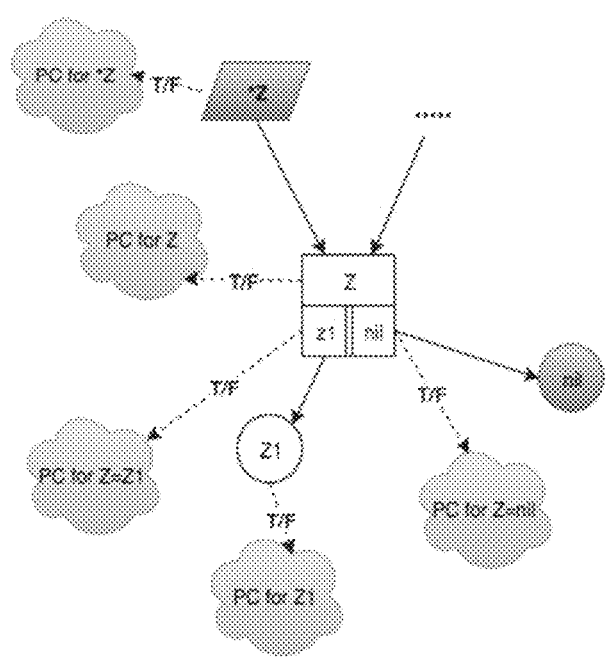
FIGS. 6A-6E illustrate diagrams of traversing the SEG to detect errors.
Figure 6B:
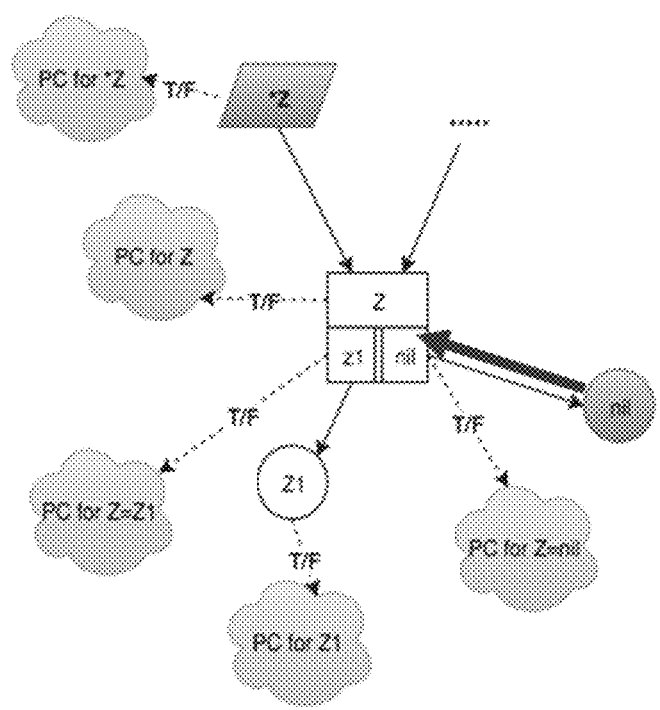
Figure 6C:
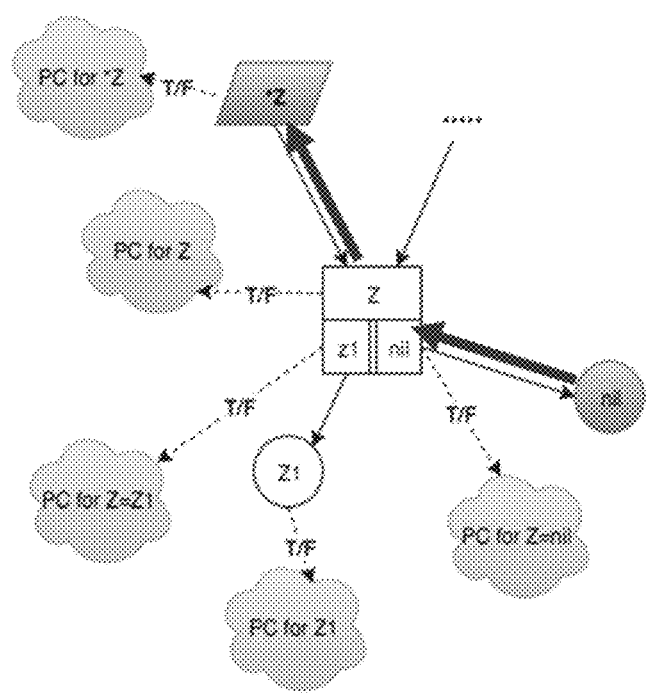

The SEG constructed above can be used to find null pointer dereferences (NPD) by searching the graph from each null sources to each dereference site. As shown in FIG. 6A, from the null node, backward traversal of the graph is performed along the data dependency edges. In this example, firstly, the process reaches the Z node, and generates constraints 71 for Z=null, as shown in FIG. 6B. And then, as shown in FIG. 6C, the process reaches the dereference site, adding the constraints 72 and checking if the constraints 72 can be satisfied. If satisfied, a bug report will be generated.

Figure 6D:
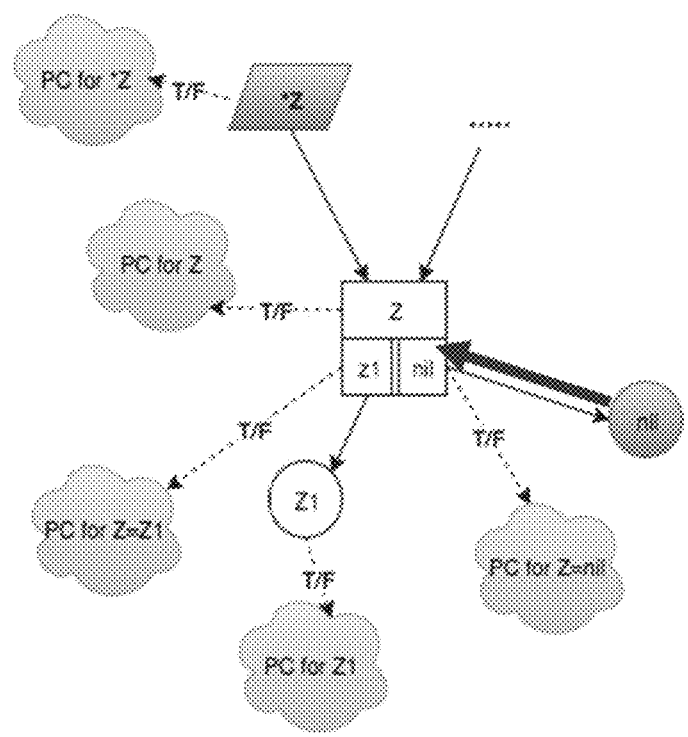
Figure 6E:
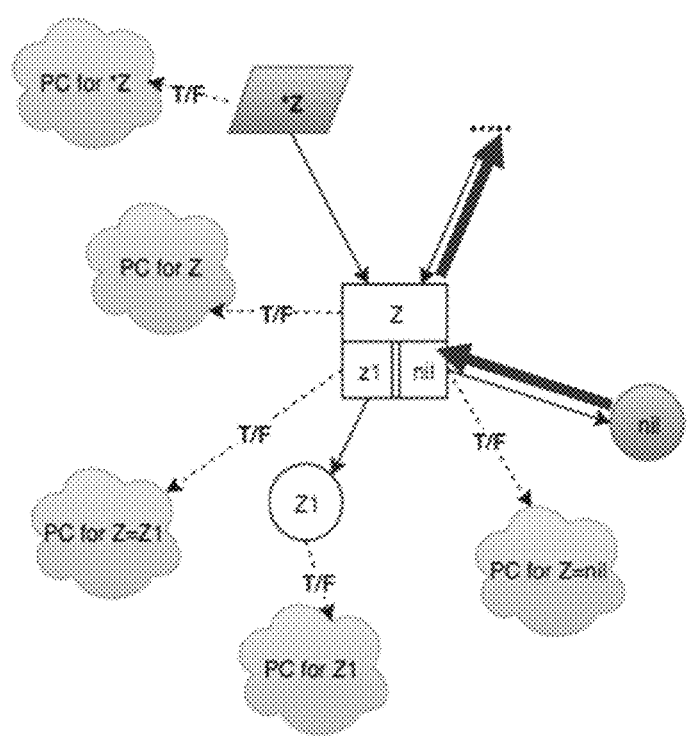

After visiting the dereference site, the process returns to the backtrace point Z, i.e., the previous node before visiting the dereference site, and pops the constraints 72 for the dereference site. The result is as shown in FIG. 6D. Then, the process continues to search the next dereference, site and add constraint 73 for that site, and repeat the above process until the traversal of the SEG is completed. Note that it is not needed to search and construct constraints from the beginning point.

In this way, the possible null pointer dereference (NPD) problem in a program can be found without having to run the program. The workflow using SEG has the advantages of high flexibility and high speed.

The exemplary embodiments of the present disclosure are shown and described above in connection with specific examples. It is to be understood that the present disclosure is not limited to the details of the specific examples of the invention, and the scope of the present invention is defined by the appended claims.

What is claimed is:

1. A defect detection method, comprising:
preprocessing, by a processor, a code to check;
generating, by the processor, a symbol expression graph (SEG) for the code to check, wherein the SEG includes nodes, data dependency edges and control dependency edges that connect the nodes, wherein, the nodes include value nodes and operator nodes, the value nodes include terminal value nodes and non-terminal value nodes, the terminal value nodes representing unknown values or constants generated outside a function, the non-terminal value node representing values generated within the function, and each of the non-terminal value nodes being associated with a unique memory location, and wherein each of the data dependency edges is a directed edge connecting a value node to another value node that has a direct data dependency relationship with the value node, and
depth-first traversing, by the processor, the SEG backward from a null pointer node in a lowest level of the SEG;
when a null pointer is detected, generating, by the processor, a constraint for the null pointer node corresponding to the null pointer;
arriving at a null pointer dereference (NPD) address of the null pointer node, adding the constraint, and determining whether the constraint is satisfied, and if satisfied, generating a bug report; and
returning to a previous node from the NFD address, and popping up the constraint of the NPD address, and continuing searching for NFD address until the SEG traversing is completed.

2. The method according to claim 1, wherein the defect is null pointer dereference (NPD).

3. The method according to claim 1, wherein each of the control dependency edges points to an operator node or a Boolean type of value node of a logical operation.

4. The method according to claim 1, wherein each of the control dependency edges is marked with true or false, to indicate the desired result of the logical operation.

5. The method according to claim 1, wherein the code to check is a code snippet, and the SEG is constructed bottom-up.

6. A defect, detection device, comprising a memory and a processor, wherein the processor is configured to execute the method according to claim 1.

7. A computer-readable medium with a computer program stored thereon, wherein when the computer program is executed, the method, according to claim 1 is performed.

8. A defect detection system includes a processor to execute instructions stored in a memory, the defect defection system comprising:
a preprocessing module configured to preprocess a code to check;
an SEG generation module, configured to generate a symbol expression graph (SEG) for the code to check, wherein the SEG generated by the SEG generation module includes nodes, data dependency edges and control dependency edges that connect the nodes, wherein, the nodes include value nodes and operator nodes, the value nodes include terminal value nodes and non-terminal value nodes, the terminal value nodes representing unknown values or constants generated outside a function, the non-terminal value nodes representing values generated within the function, and each of the non-terminal value nodes being associated with a unique memory location, and wherein each of the data dependency edge is a directed edge connecting a value node to another value node that has a direct data dependency relationship with the value node; and
a detection module, configured to depth-first traverse the SEG backward from a null pointer node in a lowest level of the SEG, wherein when a null pointer detected, generate a constraint for the null pointer node corresponding to the null pointer, arrive at a null pointer dereference (NPD) address of the null pointer node, add the constraint, determine whether the constraint is satisfied, and If satisfied, generate a bug report, and return to a previous node from the NPD address, and pop the constraint of the NPD address, and continue searching for NPD address until the SEG traversing is completed.

9. The system according to claim 8, wherein the defect is null pointer dereference (NPD).

10. The system according to claim 8, wherein each of the control dependency edges points to an operator node or a Boolean type of value node of a logical operation.

11. The system, according to claim 10, wherein each of the control, dependency edges is masked with true-or false, to indicate the desired result of the logical operation.

12. The system according to claim 8, wherein the code to check is a code snippet, and the SEG is constructed bottom-up.

* * * * *